(12) United States Patent
Rowan et al.

(10) Patent No.: US 12,468,574 B2
(45) Date of Patent: Nov. 11, 2025

(54) SYSTEMS AND METHODS FOR DYNAMICALLY SCALING REMOTE RESOURCES

(71) Applicant: Capital One Services, LLC, McLean, VA (US)

(72) Inventors: David Rowan, Plymouth Meeting, PA (US); Sudeep Pillai, Chester Springs, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 688 days.

(21) Appl. No.: 17/512,800

(22) Filed: Oct. 28, 2021

(65) Prior Publication Data
US 2023/0137673 A1 May 4, 2023

(51) Int. Cl.
*G06F 9/50* (2006.01)
(52) U.S. Cl.
CPC .......... *G06F 9/5038* (2013.01); *G06F 9/5022* (2013.01); *G06F 9/505* (2013.01); *G06F 2209/503* (2013.01)
(58) Field of Classification Search
None
See application file for complete search history.

(56) References Cited

U.S. PATENT DOCUMENTS

| | | | | |
|---|---|---|---|---|
| 9,645,847 | B1* | 5/2017 | Roth | G06F 9/461 |
| 11,481,262 | B1* | 10/2022 | Telang | G06F 9/505 |
| 11,656,912 | B1* | 5/2023 | Burgin | G06F 9/5022 |
| | | | | 718/105 |
| 2014/0007121 | A1* | 1/2014 | Caufield | G06F 9/4843 |
| | | | | 718/103 |
| 2016/0378552 | A1* | 12/2016 | Taylor | G06F 11/3442 |
| | | | | 718/105 |
| 2018/0120920 | A1* | 5/2018 | Iyigun | G06F 9/3009 |
| 2018/0324204 | A1* | 11/2018 | McClory | G06F 9/5027 |
| 2022/0068280 | A1* | 3/2022 | Bolanos | G06F 9/5022 |

* cited by examiner

*Primary Examiner* — Wynuel S Aquino
(74) *Attorney, Agent, or Firm* — TROUTMAN PEPPER LOCKE LLP; Christopher J. Forstner; John A. Morrissett (57) ABSTRACT

Systems and methods for dynamically selecting idle or underutilized resources to complete tasks in a queue are disclosed. The systems and methods include maintaining a plurality of processing resources operable to process one or more tasks. Each resource is scalable to increase or decrease a number of nodes available to perform the one or more tasks. The systems and methods include maintaining a queue for tasks to be processed, receiving a first task requiring a processing resource, and accessing at least a portion of the plurality of processing resources. A first processing resource of the plurality of processing resources is identified that is operating below a predetermined processing threshold. The first processing resource is assigned to the first task and scaled up according according to a processing requirement of the first task.

18 Claims, 5 Drawing Sheets

SYSTEMS AND METHODS FOR DYNAMICALLY SCALING REMOTE RESOURCES

FIELD

The present disclosure relates generally to systems and methods for scaling resources for tasks and, more particularly, to scheduling systems and methods that dynamically select idle or underutilized resources to complete tasks in a queue.

BACKGROUND

In cloud computing architectures, clients purchase processing resources (e.g., computing clusters) to stand ready to complete processing for any number of computing requirements. These resources/clusters include a number of "nodes," which can be scaled according to processing needs. In prior implementations of this cluster architecture, certain clusters included a minimum number of nodes—and a user of the cloud environment paid for the clusters even if the clusters were underutilized or idle.

In some prior cloud architectures, clusters also included a maximum capacity (e.g., a maximum number of nodes). This means that, if new processing tasks were received by the cloud client, the client may need to provision new cluster to handle the new task. Provisioning a new cluster (e.g., from a remote database platform) can take several minutes, meaning the task is queued for a certain amount of time before it can even be processed. After the task is processed, the client can terminate or release the cluster back to the remote database platform so that the client is not required to pay for an idle resource. Terminating the idle cluster can also take several minutes. In all, prior systems and methods for cloud computing using scalable clusters are slow, expensive, and inefficient when tasks are in queue. These and other problems exist.

BRIEF SUMMARY OF THE INVENTION

Examples of the present disclosure relate to scheduling systems and methods that dynamically select idle or underutilized resources to complete tasks in a queue, and also scale down overutilized resources when not needed.

The present disclosure provides a method for dynamically scaling cloud resources for tasks. The method can include maintaining a plurality of processing resources operable to process one or more tasks. Each resource can be scalable to increase or decrease a number of nodes available to perform the one or more tasks. The method can include maintaining a queue for tasks and monitoring the queue to determine if a new task is uploaded to be processed by the plurality of processing resources. Once a new task is identified in the queue, the method can include identifying a first processing resource of the plurality of processing resources that is operating below a predetermined processing threshold. The predetermined processing threshold can be associated with a number of instances running on each of the plurality of processing resources (e.g., one or more instances). The method can include assigning the first processing resource to the first task and, concurrently, scaling up the first processing resource according to a processing requirement of the first task.

The method can be completed without provisioning a new processing resource. However, if the queue grows beyond the capacity of the already-provisioned resources, another resource can be provisioned, and the method can be completed with the new processing resource included within the plurality of resources. The method can also include a sweeping process that includes monitoring the queue to identify whether any tasks are scheduled to be processed, and when no tasks are to be scheduled to be processed, scaling down any processing resource operating below the predetermined processing threshold via the one or more processors in communication with the remote database.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Examples of the present disclosure generally include systems and methods for scaling resources for tasks and, more particularly, to scheduling systems and methods that dynamically select idle or underutilized resources to complete tasks in a queue. The systems and methods are also able to scale down resources that are scaled too high for their current needs, which can decrease the costs associated with the already-provisioned resources.

The systems and methods described herein are necessarily rooted in computer technology as they relate to improving the functioning of cloud computing systems. Prior cloud cluster architectures require continuous monitoring of computing clusters to determine if new clusters must be provisioned to handle the processing load. If new clusters are required, the systems request a new cluster, which can take several minutes to spin up, slowing down processing speeds. Instead, the present systems and methods allow a client to increase resource processing as much as needed and add more processes at any time without interruption.

Throughout this disclosure, reference is made to resources, which can be understood to mean a group, otherwise known as a cluster, of computing nodes that work to process tasks. Certain vendors that offer these types of cloud services include, but are not limited to, Amazon EMR®, Google Kubernetes Engine® clusters, and the like. This disclosure also describes instances, which can be understood to mean a "server instance" from a remote database platform. A remote database platform can be understood to be a private or public cloud computing platform.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

Figure 1:
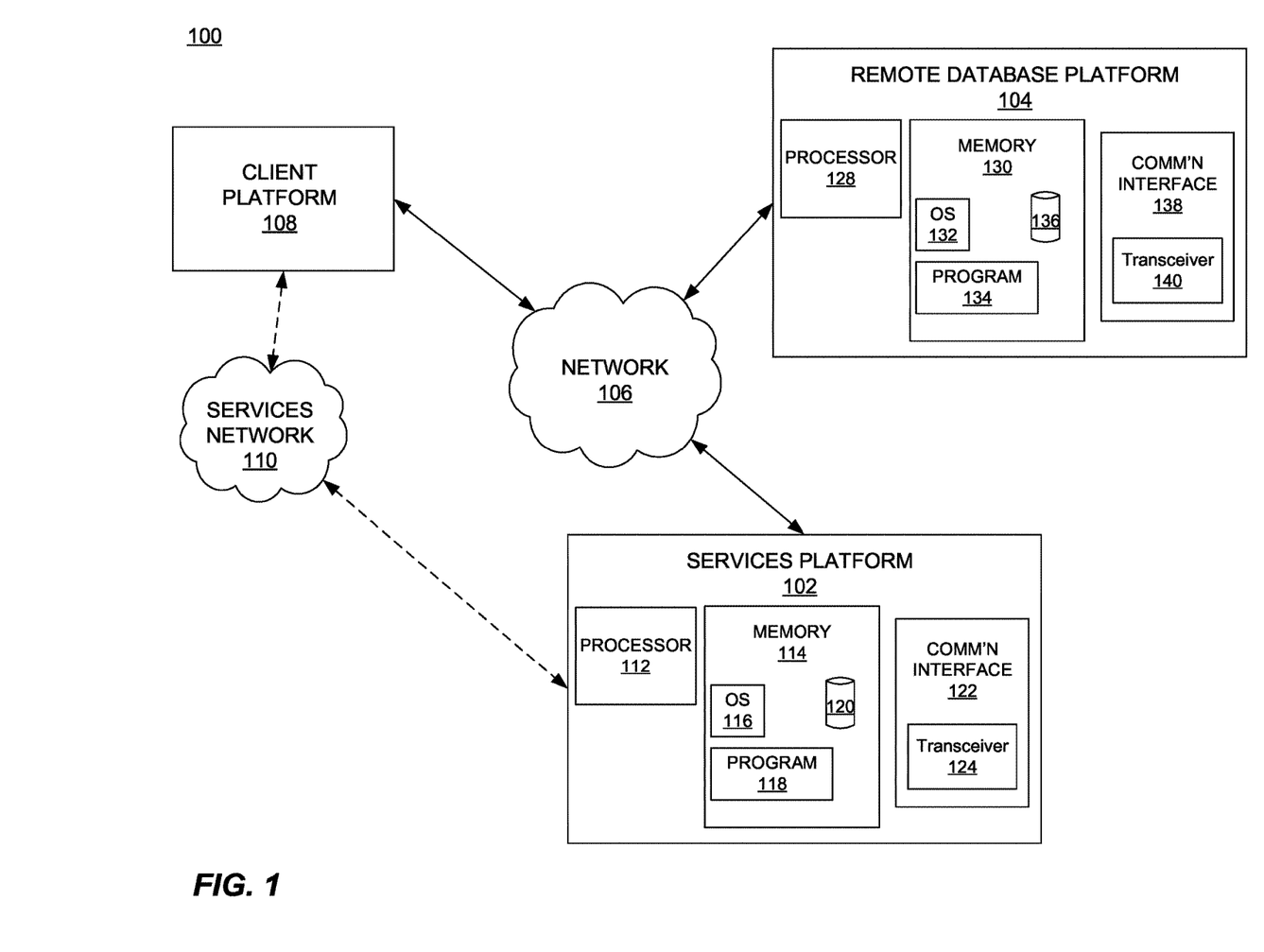
FIG. 1 is a diagram of an example system environment that can be used to implement one or more examples of the present disclosure.

FIG. 1 is a diagram of an example system environment 100 that can be used to implement one or more examples of the present disclosure. A more detailed explanation of the components of the system environment 100 is provided below. It is beneficial, however, to provide a brief overview to describe the components of the systems and methods for providing assigning and scaling clusters based on usage. The system environment 100 can include a services platform 102. The services platform 102 can be associated with the entity that communicates with internal or external clients/vendors that desire some type of service to be completed. For example, the services platform 102 can be associated with a financial institution that receives tasks requests from clients (e.g., a client platform 108, which can be associated with internal client(s) or external client(s) such as developers and other vendors). The services platform 102 can receive tasks, for example from a queue that maintains tasks from the one or more clients.

The system environment 100 can include a remote database platform 104 that operates the cloud computing architecture (e.g., clusters, data lakes, etc.). It is contemplated that the services platform 102 and the remote database platform 104 are associated with different entities. For example, the services platform 102 can be associated with a company that purchases hosting/computing services from the remote database platform 104, for example Amazon Web Services® ("AWS®") and other services. The remote database platform 104 can be associated with the remote database platform 104, for example the remote database platform 104 can be a private cloud server operated by the same or a related entity to the services platform 102.

The services platform 102, remote database platform 104, and client platform 108 can communicate with each other over a wired or wireless network 106. The network 106 can, therefore, facilitate the client platform 108 submitting tasks to a queue of tasks, can facilitate the processing of the task by the remote database platform 104, and can facilitate monitoring/adjusting of the resources by the services platform 102. Because the information transmitted can be personal or confidential (e.g., it can include passwords, financial information, or other identifying information), the connections can also be encrypted or otherwise secured. The system environment 100 can include a services network 110 that can be similar to network 106; the services network 110 can facilitate communication between clients (e.g., client platform 108) and the services platform 102 without direct communication with the cloud environment (e.g., remote database platform 104).

Figure 2:
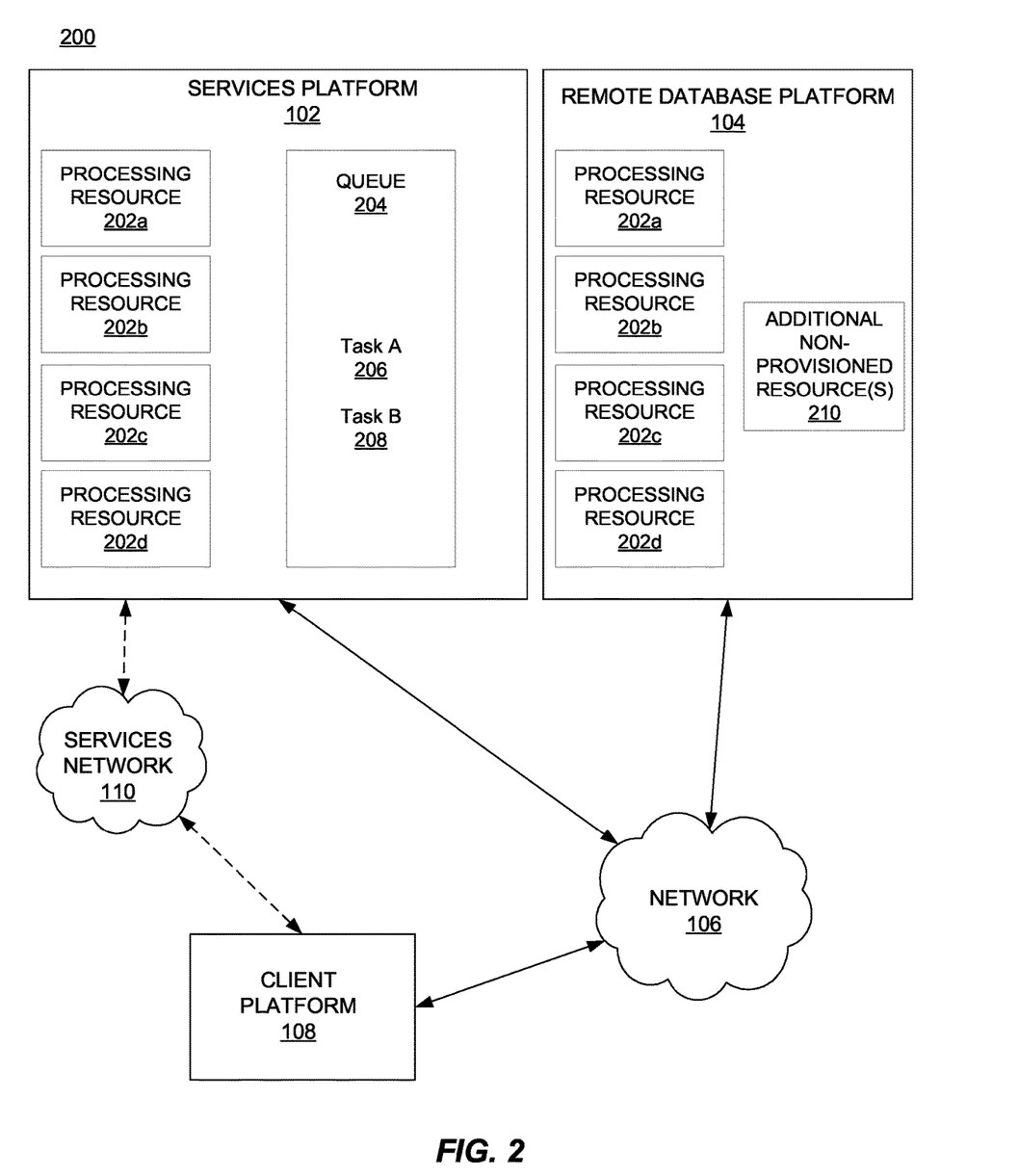
FIG. 2 is a diagram of an example system environment that can be used to implement one or more examples of the present disclosure.

FIG. 2 is a diagram of an example system environment 200 that can be used to implement one or more examples of the present disclosure. The system environment 200 in FIG. 2 includes similar components as shown in system environment 100 of FIG. 1, but shows additional details about the interaction between the services platform 102, the remote database platform 104, and the client platform 108. The remote database platform 104 can host a plurality of processing resources that can be utilized by the services platform 102 to complete tasks. For example, the remote database platform 104 can host processing resources 202a, 202b, 202c, and 202d. The services platform 102 can provision one or more of those processing resources 202a, 202b, 202c, 202d to complete tasks. The provisioned resources can remain ready to complete tasks until the services platform 102 releases, or terminates, the resource, if ever. In addition to the processing resources 202a, 202b, 202c, 202d that are provisioned by the services platform 102 and maintained by the remote resources platform 104, the remote services platform 104 can host additional resources (e.g., additional non-provisioned resource(s) 210) that can be provisioned by the services platform 102, if additional resources are needed. This is described in greater detail below with reference to FIG. 4 and process 400.

As further shown system environment 200, the services platform 102 can maintain a queue 204 of tasks to be performed. The queue 204 can, alternatively, be maintained and/or monitored by the remote database platform 104. The services platform 102 can receive, for example from the client platform 108 via the network 106 or services network 110, one or more tasks (e.g., Task A 206 and/or Task B 208) to be processed. The one or more tasks can wait in the queue 204 until the services platform 102 has resources (e.g., processing resources 202a, 202b, 202c, 202d) available to assign to the task. After the one or more tasks are completed, the used resource can be released back to the services platform and/or set to idle. The tasks can be any number of tasks that require any number of nodes. For example, performing large SQL Queries on complex datasets may require a large cluster capable of scaling to a large number of nodes, wherein simpler tasks can be performed by smaller clusters. The provisioned processing resources 202a, 202b, 202c, 202d can have different capacities according to different tasks.

Figure 3:
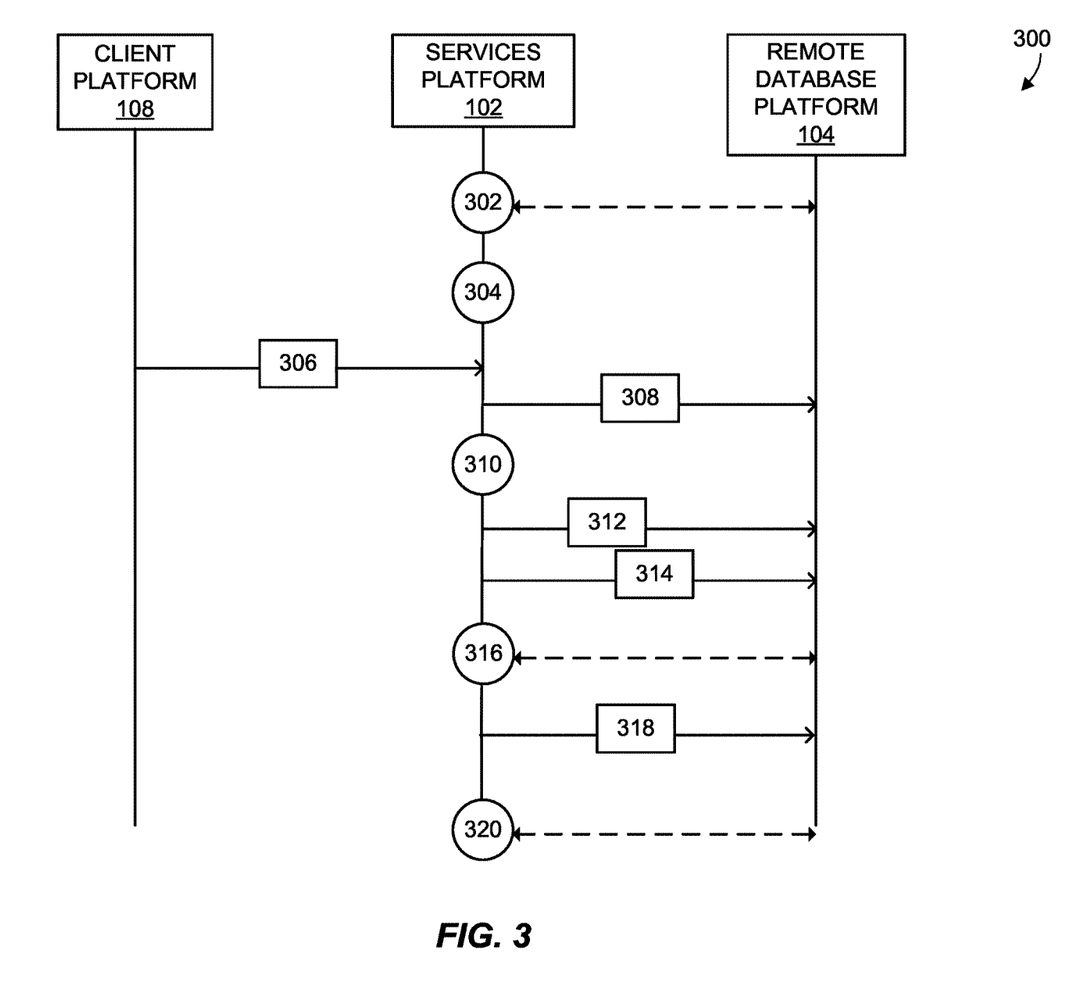
FIG. 3 is a timing diagram of an example process for assigning and scaling resources in a cloud environment based on use, according to the present disclosure.

FIG. 3 is a timing diagram of an example process 300 for assigning and scaling resources in a cloud environment based on use, according to the present disclosure. The components of the diagram include the client platform 108, services platform 102, and remote database platform 104, each described above. The services platform 102 can maintain 302 (e.g., via one or more processors like processor 112) a plurality of processing resources operable to process one or more tasks (e.g., Task A 206 and/or Task B 208 in FIG. 2). The processing resources can include the example processing resources described above with reference to FIG. 2 (e.g., processing resources 202a, 202b, 202c, 202d). Each resource can be scalable to increase or decrease a number of nodes available to perform the one or more tasks. In some examples, the processing resources can have a minimum state (e.g., an idle state) wherein the resource includes a minimum number of nodes. Oftentimes, remote database platforms 104 can require these minimum states and the client (e.g., services platform 102) will pay for the cluster even if the cluster is idle.

Process 300 can include maintaining 304, by the services platform 102 (e.g., in data storage such as database 120), a queue for tasks to be processed (e.g., queue 204). The queue 204 can include certain tasks requested by clients, either internal or external (e.g., client platform 108). For example, process 300 can include receiving 306, at the one or more processors, a first task from the queue 204 requiring a processing resource. The services platform 102 can then access 308, via the one or more processors, at least a portion of the plurality of processing resources (e.g., one or more of processing resources 202a, 202b, 202c, 202d).

At this point, the scheduling aspect of the present systems and methods can be performed to determine which of the one or more processing resources can handle the task in queue. The services platform 102 can identify 310, via the one or more processors, a first processing resource of the plurality of processing resources that is operating below a predetermined processing threshold. The predetermined processing threshold can be associated with a number of instances running on each of the plurality of processing resources. In some examples, the predetermined processing threshold can be one (1) instance running on a processing resource of the plurality of processing resources. This can mean, for example, a processing resources operating no instances is to be considered idle and/or underutilized for the purposes of selecting that resource for the next task. It is not required that the predetermined processing threshold is only one instance. For example, the predetermined processing threshold can be greater than one (1) instance running on a processing resource of the plurality of processing resources. In this case, the service platform 102 can determine that a cluster operating at a certain percentage of a full capacity (e.g., 5 nodes out of 10 as an example), is underutilized for the purposes of selecting that resource for the next task.

The services platform 102 can assign 312, via the one or more processors, the first processing resource to the first task. Concurrently, the services platform 102 can scale up 314, via the one or more processors in communication with the remote database, the first processing resource according to a processing requirement of the first task. In some examples, the processing requirement can be retrieved by the one or more processors (e.g., of the services platform 102) with the first task. For example, when a client (e.g., client platform 108) enters a task into queue to be performed, the native environment used by the client platform 108 to communicate with the services platform 102 can include fields for the client to indicate the processing needs of the task (how much memory/processing power), and the services platform 102 can then scale the first processing resource according to that retrieved processing requirement.

The services platform 102 can continue to monitor 316, via the one or more processors, the queue to identify whether any tasks are scheduled to be processed. If no tasks are to be scheduled, the services platform 102 can find any idle resources and scale down 318 the idle resources. The services platform 102 can scale down the resources that are below the predetermined processing threshold. For example, if the processing resource does not have a task and is operating under a predetermined number of instances (as described above), the services platform 102 can communicate with the remote database platform 104 to scale down the number of nodes of that particular over-scaled resource. This continuous monitoring 316 and scaling down 318 works as a "sweep" of the provisioned processing resources to ensure that none are over-scaled—e.g., are costing the service provider money to have scaled up without a need. The services platform can continue monitoring 320 the queue to determine if process 300 should be repeated—e.g., if a new task is received, steps 306-318 can be repeated.

The first processing resource described in FIG. 3 can be scaled without provisioning a new processing resource. FIG. 2, with reference to the additional non-provisioned resource(s) 210, shows an example of how new resources can be provisioned. In some examples, a new processing resource can be provisioned if the processing resources of the services platform 102 are unable to handle the load (e.g., in queue 204). An example of this is when a service provider is operating with only a few instances at any given time, but a new product, new service, or the like is added by the services platform 102, creating a need to process hundreds of instances. In this case, the systems and methods described herein can include provisioning a new resource—an option not available outside of the cloud computing environment.

Figure 4:
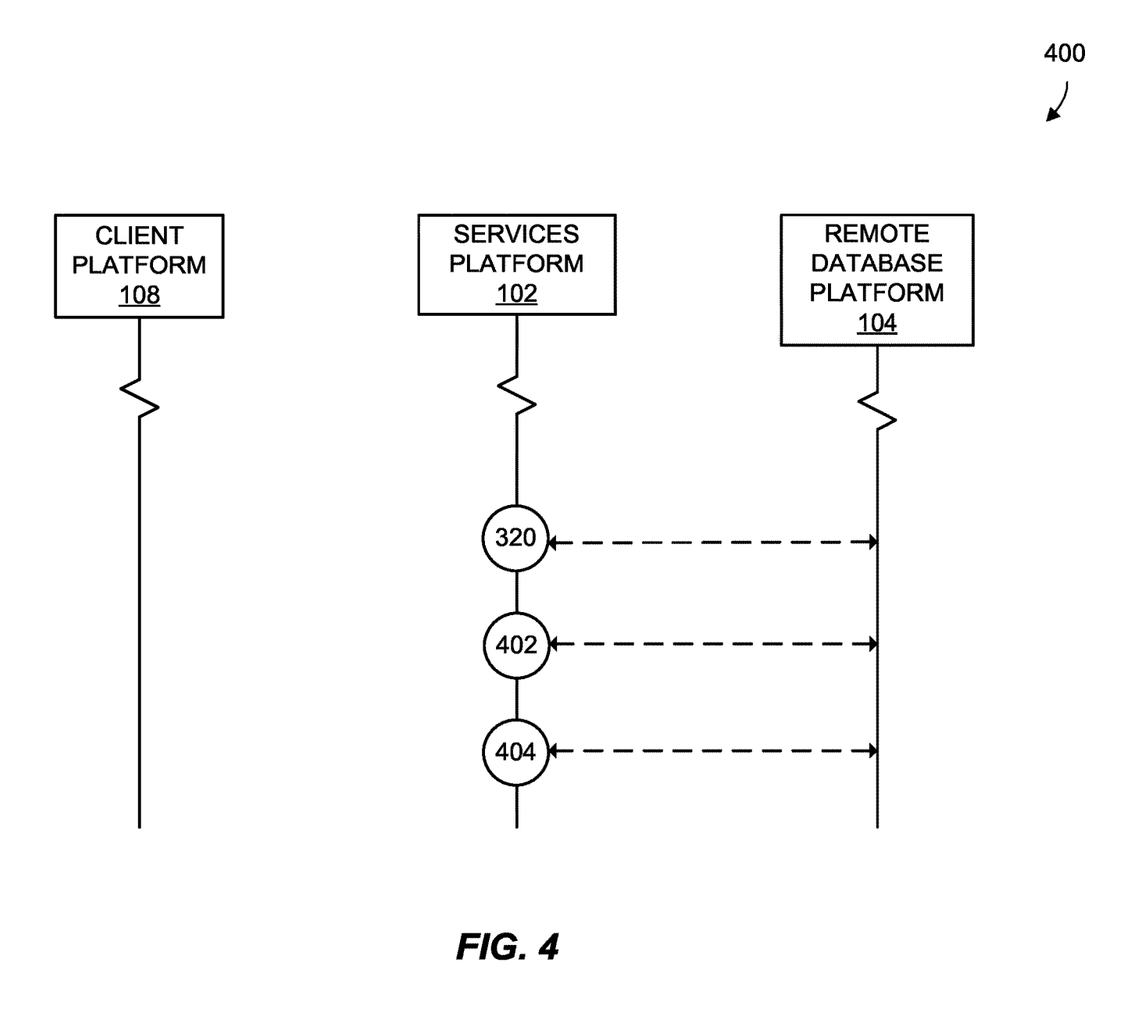
FIG. 4 is a timing diagram of an example process for provisioning a new resource to be added to the cloud environment used by a services platform, according to the present disclosure.

FIG. 4 is a timing diagram of an example process 400 for provisioning a new resource to be added to the cloud environment used by a services platform 102, according to the present disclosure. As the services platform 102 continues monitoring 320 the queue to determine if process 300 should be repeated, it can also monitor 402, via the one or more processors, the plurality of processing resources to identify processing times for tasks associated with the plurality of processing resources. When a processing time for each of the plurality of processing resources is above a predetermined value, the services platform 102 can provision 404, via the one or more processors in communication with the remote database platform 104, a new resource (e.g., one of the additional non-provisioned resource(s) 210). The processing time can be set by the services platform 102 to accommodate any particular client need. For example, if the task is taking more than a certain number of minutes, hours, etc., the services platform 102 can determine that a new resources is needed such that the queue does not continue to grow, and client needs can be met in a timely manner. Alternatively or in addition, services platform can provision 404 a new resource if the queue 204 has more than a predetermined number of tasks for processing.

Figure 5:
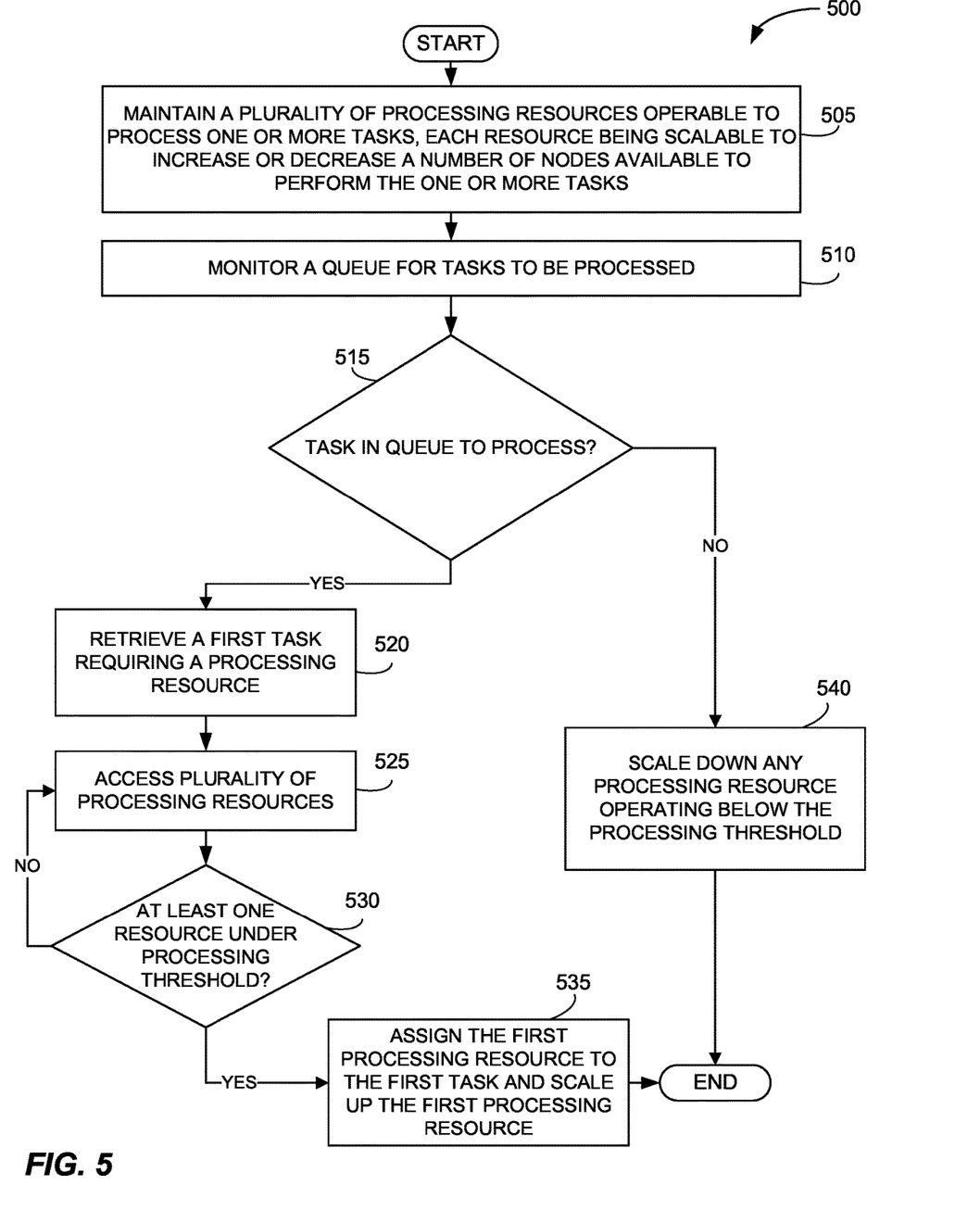
FIG. 5 is a flowchart of an example process for scaling resources according to a predetermined processing threshold, according to the present disclosure.

FIG. 5 is a flowchart of an example process 500 for scaling resources according to a predetermined processing threshold, according to the present disclosure. Process 500 can be performed in whole or in part by the components of the services platform 102, for example a processor 112, memory 114, and instructions (e.g., OS 116 and program 118) described below. Process 500 can begin when the services platform 102 maintains 505 a plurality of processing resources operable to process one or more tasks. Each resource can be scalable to increase or decrease a number of nodes available to perform the one or more tasks. The services platform 102 can monitor 510 a queue (e.g., queue 204) for tasks that need to be processed. The services platform 102 can determine 515 whether a task is in the queue to process.

If there is a task in the queue to be processed, the services platform 102 can retrieve 520 a first task requiring a processing resource from the queue. The services platform 102 can access 525 a plurality of processing resources available to the services platform 102. For example, a number of processing resources can be provisioned and available for processing tasks. If at least one processing resource is under a processing threshold (as described above), the services platform can assign 535 the first processing resource to the first task and scale up the first processing resource. If no processing resource is under the processing threshold, the services platform 102 can continue to access the plurality of resources (e.g., step 525) until it identifies a processing resource that is idle or underutilized (e.g., is processing under the processing threshold).

If there is no task in the queue to be processed, the services platform can scale down 540 any processing resource operating below the processing threshold. Process 500 can end after steps 535 or 540. In other examples, additional steps can be performed according to the examples described herein or other examples.

Referring again to the system 100 described in FIG. 1, the services platform 102 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the services platform 102 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the services platform 102 can contain an operating system ("OS") 116 that can run one or more programs 118. The one or more programs 118 can perform one or more functions of the disclosed examples. The one or more programs 118 can include, for example, a program for identifying which cluster (e.g., processing resource such as 202a, 202b, 202c, 202d) is idle or underutilized.

The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The services platform 102 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 122 can include a transceiver 124 to communicate with compatible devices, for example via short range, long range (e.g., cellular, local area networks (LAN), wide area networks (WAN), etc.), or similar technologies that enables the services platform 102 to communicate via the network 106 or services network 110 described herein.

The remote database platform 104 can be a cloud computing environment. For example, the remote database platform 104 can be a cloud environment operated by a second entity, and the rules engine can be a separate environment operated by a first entity. The remote database platform 104 can include a processor 128, memory 130, operating system 132, one or more programs 134, and one or more secured databases (e.g., database 136), which can be similar to the processor 112, memory 114, operating system 116, one or more programs 118, and database 120 described above for the services platform 102, respectively. Further the remote database platform 104 can include a communication interface 138 and a transceiver 140, which can be similar to the communication interface 122 and transceiver 124 described above with reference to the services platform 102, respectively. The client platform 108 can be substantially similar to the services platform 102 and/or the remote database platform 104 described herein.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A method for dynamically scaling cloud resources for tasks, the method comprising: maintaining, via one or more processors in communication with a remote database, a plurality of processing resources operable to process one or more tasks, each resource being scalable to increase or decrease a number of nodes available to perform the one or more tasks; maintaining, in data storage associated with the one or more processors, a queue for tasks to be processed; receiving, at the one or more processors and from the queue, a first task requiring a processing resource; accessing, via the one or more processors, at least a portion of the plurality of processing resources; identifying, via the one or more processors, a first processing resource of the plurality of processing resources that is operating below a predetermined processing threshold, wherein the predetermined processing threshold is associated with a number of instances running on each of the plurality of processing resources; assigning, via the one or more processors, the first processing resource to the first task; and scaling up, via the one or more processors in communication with the remote database, the first processing resource according to a processing requirement of the first task.

Clause 2: The method of Clause 1, wherein the predetermined processing threshold is one (1) instance running on a processing resource of the plurality of processing resources.

Clause 3: The method of Clause 1, wherein the predetermined processing threshold is greater than one (1) instance running on a processing resource of the plurality of processing resources.

Clause 4: The method of any of Clauses 1 to 3, wherein the scaling is performed without provisioning a new processing resource.

Clause 5: The method of any of Clauses 1 to 3 further comprising: monitoring, via the one or more processors, the plurality of processing resources to identify processing times for tasks associated with the plurality of processing resources; and provisioning, via the one or more processors in communication with the remote database, a new resource when a processing time for each of the plurality of processing resources is above a predetermined value.

Clause 6: The method of any of Clauses 1 to 5 further comprising: monitoring, via the one or more processors, the queue to identify whether any tasks are scheduled to be processed; and when no tasks are to be scheduled to be processed, scaling down any processing resource operating below the predetermined processing threshold via the one or more processors in communication with the remote database.

Clause 7: The method of any of Clauses 1 to 6, wherein the processing requirement is retrieved by the one or more processors with the first task.

Clause 8: A method for dynamically scaling down underutilized cloud resources, the method comprising: maintaining, via one or more processors in communication with a remote database, a plurality of processing resources operable to process one or more tasks, each resource being scalable to increase or decrease a number of nodes available to perform the one or more tasks; maintaining, via the one or more processors, a queue for tasks to be processed; monitoring, via the one or more processors, the queue to identify whether any tasks are scheduled to be processed; and when no tasks are to be scheduled to be processed, scaling down, via the one or more processors in communication with the remote database, any processing resource operating below a predetermined processing threshold, wherein the predetermined processing threshold is associated with a number of instances running on each of the plurality of processing resources.

Clause 9: The method of Clause 8 further comprising: retrieving, via the one or more processors a first task requiring a processing resource from the queue; accessing, via the one or more processors, the plurality of processing resources; identifying, via the one or more processors, a first processing resource of the plurality of processing resources that is operating below the predetermined processing threshold; assigning, via the one or more processors, the first processing resource to the first task; and scaling up the first processing resource according to a processing requirement of the first task.

Clause 10: The method of Clause 9, wherein the scaling up is performed without provisioning a new processing resource.

Clause 11: The method of Clause 9, further comprising: monitoring, via the one or more processors, the plurality of processing resources to identify processing times for tasks associated with the plurality of processing resources; and provisioning, via the one or more processors in communication with the remote database, a new resource when a processing time for each of the plurality of processing resources is above a predetermined value.

Clause 12: The method of Clause 9, wherein the processing requirement is received with the first task.

Clause 13: The method of any of Clauses 8 to 12, wherein the predetermined processing threshold is one (1) instance running on a processing resource of the plurality of processing resources.

Clause 14: The method of any of Clauses 8 to 12, wherein the predetermined processing threshold is greater than one (1) instance running on a processing resource of the plurality of processing resources.

Clause 15: A cloud system for dynamically scaling processing resources, the system comprising: a transceiver in communication with a plurality of regional servers; one or more processors; and memory in communication with the one or more processors and storing instructions that, when executed by the one or more processors, are configured to cause the system to: maintain a plurality of processing resources operable to process one or more tasks, each resource being scalable to increase or decrease a number of nodes available to perform the one or more tasks; monitor a queue for tasks to be processed; when no tasks are scheduled to be processed, scaling down any processing resource operating below a predetermined processing threshold associated with a number of instances running on each of the plurality of processing resources; and when a first task is scheduled to be processed: retrieving, from the queue, a first task requiring a processing resource; identifying a first processing resource of the plurality of processing resources that is operating below the predetermined processing threshold; assigning the first processing resource to the first task; and scaling up the first processing resource according to a processing requirement of the first task.

Clause 16: The system of Clause 15, wherein the predetermined processing threshold is one (1) instance running on a processing resource of the plurality of processing resources.

Clause 17: The system of Clause 15, wherein the predetermined processing threshold is greater than one (1) instance running on a processing resource of the plurality of processing resources.

Clause 18: The system of Clause 15, wherein the scaling up is performed without provisioning a new processing resource.

Clause 19: The system of Clause 15 wherein the instructions are further configured to cause the system to: monitor the plurality of processing resources to identify processing times for tasks associated with the plurality of processing resources; and provision a new resource when a processing time for each of the plurality of processing resources is above a predetermined value.

Clause 20: The system of any Clauses 15 to 19, wherein the processing requirement is received with the first task.

Exemplary Use Cases

The following exemplary use cases describe examples of a typical user flow pattern. They are intended solely for explanatory purposes and not limitation.

National Bank offers many services to its clients, including both internal and external (e.g., vendors such as web developers) clients. One of the services the institution performs internally is to categorize financial transactions for at least portions of its customer base, reconfigure the data to conform with the requirements of a machine learning model, and upload this reconfigured data into their model to train the model on customer habits. This type of data upload/manipulation requires a large computing cluster in which to process the task.

The business team of National Bank uploads a task, a request to process one of the transaction uploads described above, to a queue managed by National Bank's internal service provider system, e.g., a services platform. As an example for illustration only, it can be considered that National Bank uses Amazon Web Service (AWS®) as a remote database platform (i.e., AWS® EMR clusters are the processing resources in this example). Once the task is in the queue and identified, the services platform queries a number of provisioned processing resources to identify if any are operating below a predetermined processing threshold. National Bank has previously set the predetermined processing threshold to be one (1) instance (e.g., if a cluster is operating without any instances running, the cluster is underutilized for National Bank). The services platform identifies two separate clusters that are idle: a first cluster identified as m6g.xlarge, and a second cluster identified as m6g.4xlarge. Since the task uploaded by the business team has large processing requirement, the services platform selects the larger cluster (m6g.4xlarge), scales up the cluster from its idle state to process the task, and assigns the cluster to the task.

The services platform for National Bank continues to monitor its provisioned processing resources to identify if any remain scaled up even though the cluster is not processing any task and no tasks are in the queue. Once the task submitted by the business team is complete, the continuous monitoring of the clusters identifies the m6g.4xlarge as operating below the predetermined processing threshold (no instances are running on the cluster), and scales down the cluster and any other underutilized cluster.

What is claimed is:

1. A method for dynamically scaling cloud resources for tasks, the method comprising:
   maintaining, via one or more processors in communication with a remote database, a plurality of processing resources operable to process one or more tasks, each resource being scalable to increase or decrease a number of nodes available to perform the one or more tasks;
   maintaining, in data storage associated with the one or more processors, a queue for tasks to be processed;
   receiving, at the one or more processors and from the queue, a first task requiring a processing resource;
   accessing, via the one or more processors, at least a portion of the plurality of processing resources;
   identifying, via the one or more processors, a first processing resource of the plurality of processing resources that is operating below a predetermined processing threshold, wherein the predetermined processing threshold is associated with a number of instances running on each of the plurality of processing resources, and wherein any processing resource of the plurality of processing resources operating below the predetermined processing threshold is considered an idle resource;
   assigning, via the one or more processors, the identified first processing resource to the first task;
   scaling up, via the one or more processors in communication with the remote database, the identified first processing resource according to a processing requirement of the first task;
   monitoring, via the one or more processors, the queue to identify whether any tasks are scheduled to be processed; and
   when no tasks are to be scheduled to be processed, scaling down the identified first processing resource associated with the predetermined processing threshold via the one or more processors in communication with the remote database, wherein the first processing resource (i) is scaled down below the predetermined processing threshold associated with the number of instances and (ii) remains provisioned after being scaled down.

2. The method of claim 1, wherein the predetermined processing threshold is one (1) instance running on a processing resource of the plurality of processing resources.

3. The method of claim 1, wherein the predetermined processing threshold is greater than one (1) instance running on a processing resource of the plurality of processing resources.

4. The method of claim 1, wherein the scaling is performed without provisioning a new processing resource.

5. The method of claim 1 further comprising:
   monitoring, via the one or more processors, the plurality of processing resources to identify processing times for tasks associated with the plurality of processing resources; and
   provisioning, via the one or more processors in communication with the remote database, a new resource when a processing time for each of the plurality of processing resources is above a predetermined value.

6. The method of claim 1, wherein the processing requirement is retrieved by the one or more processors with the first task.

7. A method for dynamically scaling down underutilized cloud resources, the method comprising:
   maintaining, via one or more processors in communication with a remote database, a plurality of processing resources operable to process one or more tasks, each resource being scalable to increase or decrease a number of nodes available to perform the one or more tasks;
   maintaining, via the one or more processors, a queue for tasks to be processed;
   monitoring, via the one or more processors, the queue to identify whether any tasks are scheduled to be processed;
   identifying, via the one or more processors, a first processing resource of the plurality of processing resources that is operating below a predetermined processing threshold;
   assigning, via the one or more processors, the identified first processing resource to a first task in the queue for tasks;
   scaling up the identified first processing resource according to a processing requirement of the first task; and
   when no tasks are to be scheduled to be processed, scaling down, via the one or more processors in communication with the remote database, the identified first processing resource associated with the predetermined processing threshold,
   wherein the predetermined processing threshold is associated with a number of instances running on each of the plurality of processing resources, wherein any processing resource of the plurality of processing resources operating below the predetermined processing threshold is considered an idle resource, and wherein the identified first processing resource, when scaled down for operating below the predetermined processing threshold associated with the number of instances, remains provisioned.

8. The method of claim 7, wherein the scaling up is performed without provisioning a new processing resource.

9. The method of claim 7, further comprising:
   monitoring, via the one or more processors, the plurality of processing resources to identify processing times for tasks associated with the plurality of processing resources; and provisioning, via the one or more processors in communication with the remote database, a new resource when a processing time for each of the plurality of processing resources is above a predetermined value.

10. The method of claim 7, wherein the processing requirement is received with the first task.

11. The method of claim 7, wherein the predetermined processing threshold is one (1) instance running on a processing resource of the plurality of processing resources.

12. The method of claim 7, wherein the predetermined processing threshold is greater than one (1) instance running on a processing resource of the plurality of processing resources.

13. A cloud system for dynamically scaling processing resources, the system comprising:
   a transceiver in communication with a plurality of regional servers;
   one or more processors; and
   memory in communication with the one or more processors and storing instructions that, when executed by the one or more processors, are configured to cause the system to:
      maintain a plurality of processing resources operable to process one or more tasks, each resource being scalable to increase or decrease a number of nodes available to perform the one or more tasks;
      monitor a queue for tasks to be processed;
      when no tasks are scheduled to be processed, scaling down a first processing resource operating below a predetermined processing threshold associated with a number of instances running on each of the plurality of processing resources, and wherein any processing resource of the plurality of processing resources operating below the predetermined processing threshold is considered an idle resource, wherein the first processing resource, after being scaled down for operating below the predetermined processing threshold associated with the number of instances, remains provisioned; and
      when a first task is scheduled to be processed:
         retrieving, from the queue, a first task requiring a processing resource;
         identifying the first processing resource of the plurality of processing resources that is operating below the predetermined processing threshold;
         assigning the identified first processing resource to the first task; and
         scaling up the identified first processing resource according to a processing requirement of the first task.

14. The system of claim 13, wherein the predetermined processing threshold is one (1) instance running on a processing resource of the plurality of processing resources.

15. The system of claim 13, wherein the predetermined processing threshold is greater than one (1) instance running on a processing resource of the plurality of processing resources.

16. The system of claim 13, wherein the scaling up is performed without provisioning a new processing resource.

17. The system of claim 13 wherein the instructions are further configured to cause the system to:
   monitor the plurality of processing resources to identify processing times for tasks associated with the plurality of processing resources; and
   provision a new resource when a processing time for each of the plurality of processing resources is above a predetermined value.

18. The system of claim 13, wherein the processing requirement is received with the first task.

* * * * *